United States Patent [19]

Nao et al.

[11] Patent Number: 5,786,970
[45] Date of Patent: Jul. 28, 1998

[54] STABILIZED POWER SOURCE CIRCUIT AND IC INCORPORATING THE SAME

[75] Inventors: Yuhji Nao, Kyto; Susumu Fujihara, Kobe, both of Japan

[73] Assignees: Rohm, Co., Ltd., Kyoto; Fujitsu Ten Limited, Kobe, both of Japan

[21] Appl. No.: 611,751

[22] Filed: Mar. 6, 1996

[30] Foreign Application Priority Data

Mar. 20, 1995 [JP] Japan ............... 7-087340

[51] Int. Cl.⁶ .................................... H02H 3/00
[52] U.S. Cl. .............. 361/18; 361/79; 361/87; 361/93; 323/284
[58] Field of Search ............... 361/18, 56, 57, 361/58, 94, 95, 96, 97, 98, 101, 79, 87; 323/273, 274, 284, 285, 312, 313

[56] References Cited

U.S. PATENT DOCUMENTS 5,375,029  12/1994  Fukunaga et al. ............ 361/101
5,428,287   6/1995  Agiman ...................... 323/284

*Primary Examiner*—Jeffrey A. Gaffin
*Assistant Examiner*—Michael J. Sherry
*Attorney, Agent, or Firm*—Fay, Sharpe, Beall, Fagan, Minnich & McKee

[57] ABSTRACT

A stabilized power source circuit is provided with an over current protecting circuit which obtains either a current value or a voltage value corresponding to an output current value of an output transistor as a detected value, compares the detected value with a predetermined constant value and lowers the output current when the detected value exceeds the predetermined constant value. A comparing value generating circuit receives an external signal, generates one of either a predetermined plurality of voltage values or a predetermined plurality of current values in response to the level of the received external signal and transmits the same to the over current protecting circuit as the predetermined constant value. Either the predetermined plurality of voltage values or the predetermined plurality of current values are provided so as to correspond to the respective output current values to be detected as the respective over currents of the output transistor and an inherent rated current value of the output transistor is selected to be equal to or larger than the maximum value among the respective output current values to be detected as the over currents of the output transistor.

10 Claims, 4 Drawing Sheets

FIG. 3

| COMPARATOR OUTPUT | 0~0.9V | 1.0~1.9V | 2.0~2.9V | 3.0~3.9V | 4.0~V |
|---|---|---|---|---|---|
| COMPARATOR 31m | L | H | H | H | H |
| COMPARATOR 31a | H | H | L | L | L |
| COMPARATOR 31b | H | H | H | L | L |
| COMPARATOR 31c | H | H | H | H | L |
| TRANSISTOR Qe | OFF | ON | ON | ON | ON |
| TRANSISTOR Tra | ON | ON | OFF | OFF | OFF |
| TRANSISTOR Trb | ON | ON | ON | OFF | OFF |
| TRANSISTOR Trc | ON | ON | ON | ON | OFF |

STABILIZED POWER SOURCE CIRCUIT AND IC INCORPORATING THE SAME

BACKGROUND OF THE INVENTION

1. Field of the Invention

The present invention relates to a stabilized power source circuit and an IC incorporating the same and, more specifically, relates a stabilized power source circuit suitable for forming into an IC which detects an over current (a current larger than a predetermined current) of the output current of a power transistor for regulating a power source voltage, performs a control for preventing the over current and is permitted to select lately a current value to be detected as an over current depending on the use condition of the power source circuit.

2. Description of Related Art

FIG. 4 shows an example of conventional stabilized power source circuits incorporated in an IC. Further, FIG. 5 shows a stabilized power source circuit in which an over current detecting transistor Qp' is further provided of which base is connected in common with the base of an output transistor (power transistor) Qp in FIG. 4 and has 1/n emitter area thereof.

In both drawings, the stabilized power source circuits comprise a reference voltage source 1 which generates reference voltage Vr, an output voltage detection circuit 2 which generates a detection voltage Vf by dividing the output Vo of the stabilized power source circuit with resistors R1 and R2, and an error amplifying circuit 3 which amplifies an error component between the reference voltage Vr and the detection voltage Vf and outputs the same, and further comprise a transistor Qp which receives at the base thereof the output from the error amplifying circuit 3 via control of a current control circuit 5 and an over current detection circuit 4 which detects an over current of the output current from the transistor Qp and sends out a detection signal to the current control circuit 5.

In the stabilized power source circuits, the transistor Qp functions as a regulation transistor which lowers the source voltage Vcc down to the output voltage Vo depending on the output from the error amplifying circuit 3. In FIG. 5, when the transistor Qp' operates together with the regulation transistor Qp and detects a 1/n over current of 1/n collector current of the transistor Qp at the transistor Qp', an over current of the output transistor Qp is detected.

With these circuits an error signal A corresponding to a deviation amount of the output voltage Vo from a target value is generated so as to perform a control to achieve Vf=Vr, in that the output voltage Vo is controlled so as to reach the target value (Vr×(R1+R2)/R2) of a constant value. Even when the power source voltage Vcc fluctuates or when the condition of the load side receiving the output voltage Vo varies, the output voltage Vo is more or less stabilized at the target value.

Further, the error signal is in principle generated depending on the difference of the output voltage Vo from the target value, however in practice, a predetermined rate, for example R2/(R1+R2) is generally multiplied to the output voltage Vo to determine a lower detection voltage Vf, likely the same rate R2/(R1+R2) is multiplied to the target voltage value to determine a lower reference voltage Vr, then a control is performed so as to coincide these two lowered voltages while generating an error signal thereof.

The over current detection circuit 4 detects the moment when a current more than a rated current (a predetermined maximum output value) of the transistor Qp flows through the collector of the transistor Qp. The current control circuit 5 is for controlling the operating current of the error amplifying circuit 3 in response to the detection signal, and is normally fed from the current source of the error amplifying circuit 3. These circuits detect a moment when the output current via the transistor Qp or the transistor Qp' has exceeded or immediately before exceeds the rated current of the transistor Qp by the over current detection circuit 4 and limit the output current while suppressing the operating current of the error amplifying circuit 3 by the current control circuit 5. Namely, these circuits serve as a protective circuit for the transistor Qp.

When an over current is detected, amplification rate of the error amplifier 3 reduces, an increase of the error signal A is suppressed and an increase of the output current is thus suppressed prior to stabilization of the output voltage Vo. As a result, the output current is limited to be equal to or less than the rated output current value of the output transistor Qp. Thereby, breakdown of the output transistor Qp as well as an IC incorporating the same is prevented. Further, the target value determined with regard to the output voltage Vo is normally set within a range not exceeding the rated current.

In these conventional stabilized power source circuits incorporated into an IC, a power transistor is used for controlling the output voltage. An area of the transistor region of a power transistor is designed to be large for permitting a large current flow so that the power transistor is required to have measures for preventing a local current concentration and for making the current density uniform. Further, the power transistor is required to be designed to make the wiring resistance uniform and to suppress process variation.

On the other hand, with regard to audio device products of a variety of models but each having small quantity have been developed to which a variety of functions meeting the demands and desires of users are added. For example, a certain product of an audio device is identical as another product with regard to their outputs such that their output amplifiers are identical, however, the variety of additional functions of the certain product are different from those of the other product, therefore the circuit portions relating to the additional functions are different. Thus, these products are respectively manufactured as different models. Contrary thereto, if a circuit relating to the additional functions of a certain product is substantially identical to another product and a circuit relating to the output amplifier thereof is different from that of the other because of the difference of their outputs as audio devices, these products are manufactured as different models.

Therefore, if power source circuits are designed and formed into ICs for every product of a variety of models but each having small quantity to which a variety of different functions are added, kinds of the power source circuits increase and the corresponding increase of their production cost is unavoidable. Further, the complicated management of the respective ICs is also necessitated. Still further, the designers frequently encounter the necessity of modifying the current capacity of the power source circuit because of their specification alternation at the time when performing the designing. In such instance, the designers have to redesign the power source circuit.

On the other, it can be conceivable to design a power source circuit having a large capacity and to form the same into an IC beforehand in view of the above mentioned circumstance, and to use the same for a load having a small current capacity, however, such use may cause a problem that if a large current flows instantaneously through the load circuit, the load circuit can not be protected. Accordingly, it is difficult to use a common power source circuit for a variety of models having different specifications.

An invention relating to an over current protecting circuit for a stabilized power source is disclosed in U.S. Pat. No. 5,491,401 which is incorporated herein by reference.

SUMMARY OF THE INVENTION

An object of the present invention is to provide a stabilized power source circuit which can be used as the power source circuit having an over current protecting function substantially meeting to a required rated output current after production as either an IC incorporating the power source circuit or the power source circuit of an IC.

Another object of the present invention is to provide an IC having a stabilized power source circuit which can select a current value to be detected as an over current depending on the use condition of the power source circuit after production as either an IC incorporating the power source circuit or the power source circuit of an IC.

The features of the stabilized power source circuit according to the present invention which achieve the above objects are to comprise an over current protecting circuit which obtains either a current value or a voltage value corresponding to an output current value of an output transistor as a detected value, compares the detected value with a predetermined constant value and lowers the output current when the detected value exceeds the predetermined constant value; and a comparing value generating circuit which receives an external signal, generates one of either a predetermined plurality of voltage values or a predetermined plurality of current values in response to the level of the received external signal and transmits the same to the over current protecting circuit as the predetermined constant value, wherein either the predetermined plurality of voltage values or the predetermined plurality of current values are provided so as to correspond to the respective output current values to be detected as the respective over currents of the output transistor, and an inherent rated current value of the output transistor is selected to be equal to or larger than the maximum value among the respective output current values to be detected as the over currents of the output transistor.

In the thus constituted stabilized power source circuit the comparing value generating circuit selects the predetermined constant value serving as a reference for the over current detection among either the predetermined plurality of the voltage values or the predetermined plurality of the current values in response to the signal level supplied from an external device and generates the same, and the over current protecting circuit performs the over current detection by making use of the selected predetermined constant value as the comparing reference and suppresses the output current of the output transistor. Accordingly, with the stabilized power source circuit according to the present invention, a rated current of a power transistor for the power source voltage regulation can be set at a rated current value in correspondence with the selected predetermined constant value merely by applying a signal having a predetermined level from the external device and an over current protecting operation is performed when the set rated current value is exceeded.

Thereby, in each of the power source circuits of an IC or the ICs incorporating the power source circuit one of the predetermined respective over current detection values can be afterward selected as the suppliable rated current value of the power source circuit by means of the external signal. Accordingly, the ICs incorporating the same power source circuit or the same power source circuits of an ICs can be used as ICs incorporating the power source circuit or the power source circuits of an IC having different rated current values.

As a result, common ICs incorporating a power source circuit or common power source circuits of an IC are realized for the product of a variety of models but each having a small quantity to which a variety of different functions are added, thus, power source circuits of an IC having variety of specifications and ICs having power source circuits of different specifications can be realized by the single kind common IC and the conventional need of preparing specifically of the respective separate ICs is eliminated. Thereby, the conventional need of designing the power source circuit and forming the same into an IC every time when the specification is modified is eliminated and the management complexity of the ICs is also eliminated. Further, in case when the current capacity of the power source circuit has to be modified in accordance with a specification alternation at the time of designing stage, the designer can easily meet the requirement simply by modifying the level of the external signal.

BRIEF DESCRIPTION OF THE DRAWINGS

FIG. 3 is a table showing the operation of the circuit shown in FIG. 2;

DESCRIPTION OF THE PREFERRED EMBODIMENTS

Figure 1:
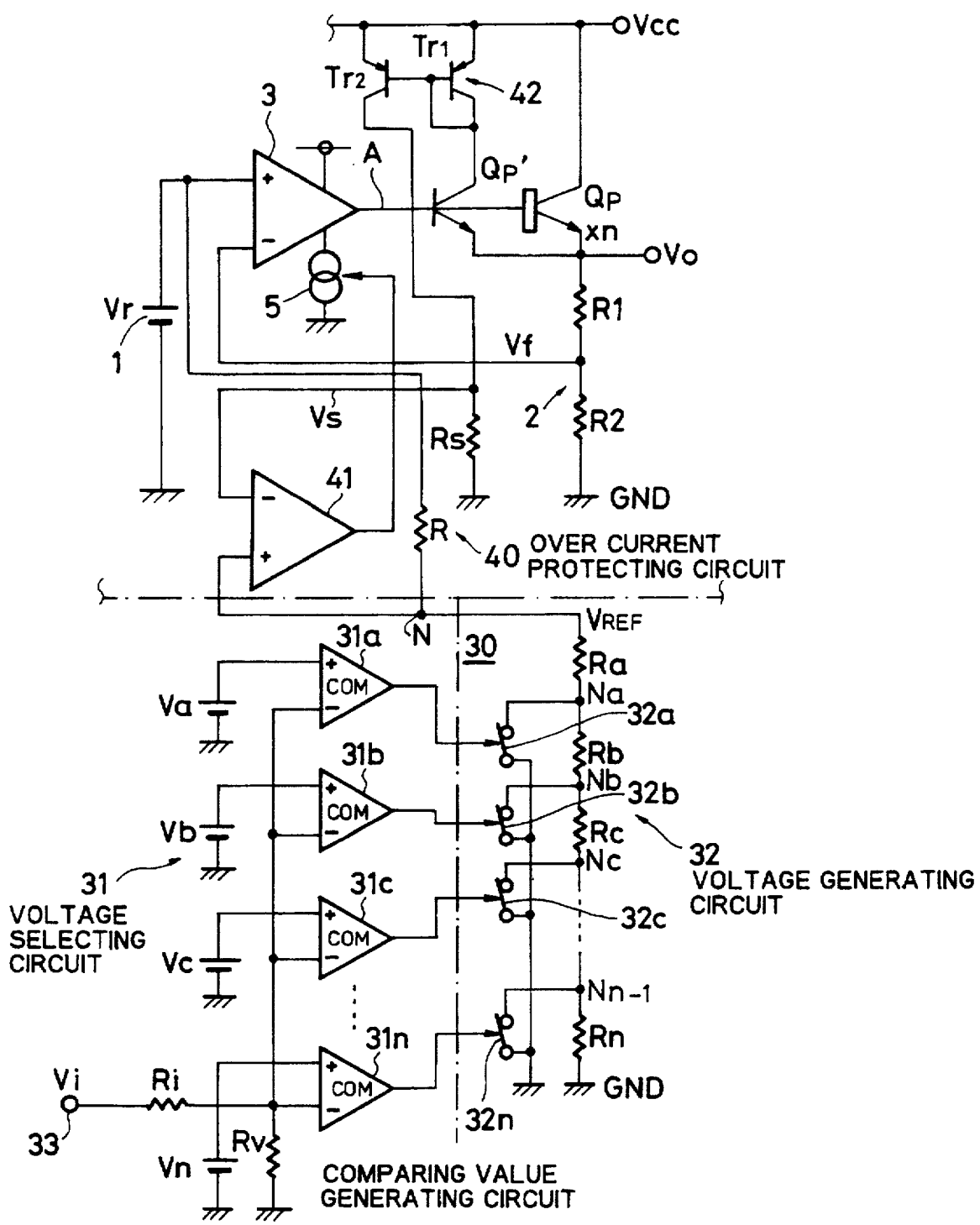
FIG. 1 is a block diagram of one embodiment of the stabilized power source circuits to which the present invention is applied.
Figure 4:
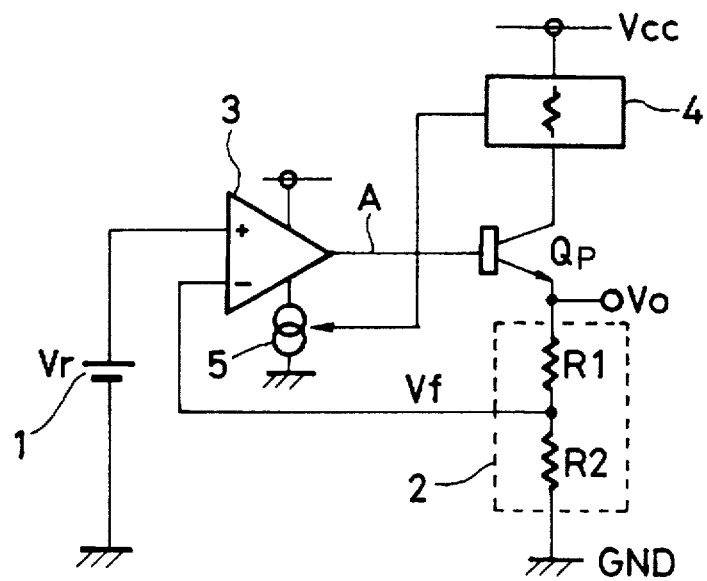
FIG. 4 is an example of conventional stabilized power source circuits.
Figure 5:
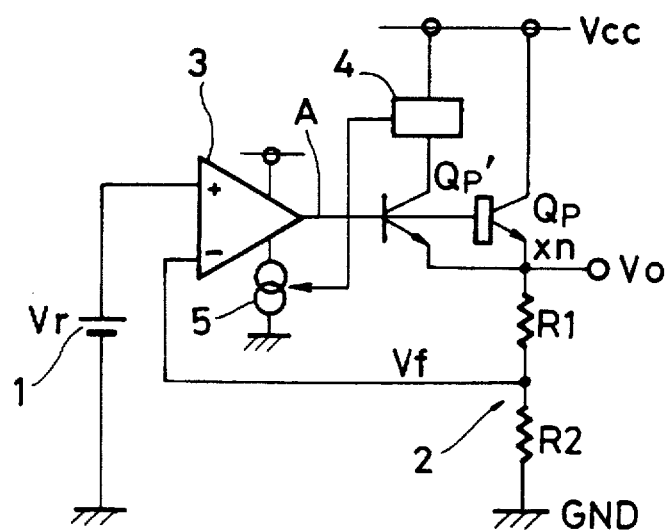
FIG. 5 is another example of conventional stabilized power source circuits.

A reference voltage source 1, an output voltage detecting circuit 2 and an error amplifying circuit 3 in FIG. 1 are the circuits equivalent to the conventional ones as shown in FIG. 4 and are assigned the same reference numerals as these in FIG. 4. Further, the power transistors Qp and Qp' in FIG. 1 are also equivalent to those shown in FIG. 4 and FIG. 5. In FIG. 1 embodiment, in place of the over current protecting circuit 4 in FIG. 4 or in FIG. 5 an over current protecting circuit 40 is provided and further a comparing value generating circuit 30 is provided. Therefore, hereinbelow these circuits are primarily explained.

The comparing value generating circuit 30 is constituted by a voltage selecting circuit 31 and a voltage generating circuit 32. The voltage selecting circuit 31 generates a selecting signal for selecting one of voltage values (comparing voltage values) serving as a reference to be compared in response to an external signal and transmits the same to the voltage generating circuit 32. The voltage generating circuit 32 generates one of predetermined comparing voltage values in response to the selecting signal and transmits the same to the over current protecting circuit 40.

The voltage selecting circuit 31 is constituted by a plurality of reference voltage sources Va, Vb, Vc, . . . , Vn and a plurality of comparators (COM) 31a, 31b, 31c, ..., 31n. When assuming the voltages generated by the reference voltage sources Va, Vb, Vc, ..., Vn as respectively Va, Vb, Vc, ..., Vn, these voltages are determined as Va<Vb<Vc< ... <Vn. The plurality of the comparators 31a, 31b, 31c, ..., 31n are respectively provided so as to correspond to the respective reference voltage sources Va, Vb, Vc, ..., Vn, receive at their (+) inputs the respective reference voltages Va, Vb, Vc, ..., Vn and further receive at their respective (−) inputs an external signal (DC voltage signal or DC current sunk to the ground GND through the resistor Rv) from an input terminal 33 via a resistor Ri. The respective comparators compare the voltage of the external signal with the respective reference voltages Va, Vb, Vc, ..., Vn and output signals for selecting one of comparing voltage values to be generated to the voltage generating circuit 32.

A resistor Rv disposed between the (−) inputs of the respective comparators 31a, 31b, 31c, ..., 31n and the ground GND is a biasing resistor.

In the present embodiment, the respective comparators 31a, 31b, 31c, ..., 31n constitute reverse amplifying type comparators wherein the (−) inputs receive input signals and (+) inputs receive reference signals. Therefore, when no input signal is applied at the input terminal 33, the outputs of the comparators are HIGH level (hereinbelow simply, indicated as "H"). When an input signal is applied at the input terminal 33 and the voltage thereof exceeds any of the respective reference voltages Va, Vb, Vc, ..., Vn, the outputs of the comparators having lower reference voltages at their (+) inputs than the voltage level of the input signal are rendered to LOW level (hereinbelow simply indicated as "L").

The voltage generating circuit 32 is constituted by switching circuits 32a, 32b, 32c, ..., 32n and a series circuit of a resistor R and resistors Ra, Rb, Rc, ..., Rn. The switching circuits 32a, 32b, 32c, ..., 32n are provided so as to correspond to the respective comparators and are designed to turn ON or OFF in response to the respective outputs of the corresponding comparators. The series circuit of the resistor R and the resistors Ra, Rb, Rc, ..., Rn is disposed between the (+) input of the error amplifying circuit 3 and the ground GND and generates a divided voltage $V_{REF}$ serving as a comparing reference at the junction point of the resistor R and the resistor Ra. Since the reference voltage Vr of the reference voltage source 1 is applied at the (+) input of the error amplifying circuit 3, the divided voltage $V_{REF}$ represents a voltage obtained by dividing the reference voltage Vr by the series circuit.

The pair of connecting terminals of the respective switching circuits 32a, 32b, 32c, ..., 32n are respectively connected to the junction point Na of the resistors Ra and Rb, the junction point Nb of the resistors Rb and Rc, the junction point Nc of the resistors Rc and Rd ... the junction point $N_{n-1}$ of the resistors $R_{n-1}$ and $R_n$, and the ground GND. As a result, in response to turning ON of any of the switching circuits, the corresponding junction points to which turned ON switching circuits are connected are connected to the ground GND.

The over current protecting circuit 40 is constituted by a current mirror 42 composed of transistors $T_{r1}$, and $T_{r2}$, an over current detection use resistor Rs and a differential amplifier circuit 41. The input side transistor $T_{r1}$ i is in a diode connection and is inserted between the collector of the over current detection use transistor Qp' and a power source line Vcc. The emitter of the output side transistor $T_{r2}$ is connected to the power source line Vcc and the current for the over current detection flowing out therefrom is applied to the resistors provided downstream thereof. Thus, the over current detection use resistor Rs is disposed between the collector of the transistor $T_{r2}$ and the ground GND.

The differential amplifier circuit 41 receives at the (−) input a voltage value Vs generated across the resistor Rs and further receives at the (+) input the divided voltage $V_{REF}$ at the junction point N. The differential amplifier circuit 41 is an amplifier which performs an amplifying operation at single sided level in that at negative side level and generates an output only when the voltage at the (−) input exceeds the voltage at the (+) input. Namely, the differential amplifier circuit 41 generates an output which causes to increase a current to be sunk at the output terminal thereof in response to the voltage increase at the (−) input as a detection signal. The detection signal is transmitted to the current control circuit 5 in the error amplifying circuit 3 so as to serve as a control current which lowers and suppresses the amplifying operation of the error amplifying circuit 3.

Now, the over current protecting operation is explained. The terminal voltage Vs at the resistor Rs increases in accordance with the increase of the current flowing through the transistor $T_{r2}$. The current flowing through the transistor $T_{r2}$ is determined by the current flowing through the transistor $T_{r1}$ with which the transistor $T_{r2}$ is connected in a current mirror and increases or decreases depending on the output current of the power transistor Qp (power transistor Qp'). Accordingly, the terminal voltage Vs is determined in accordance with the output current value of the power transistor Qp and increases or decreases depending thereon. Namely, the terminal voltage Vs represents the detection voltage representing the output current value of the power transistor Qp.

When the voltage Vs exceeds the divided voltage $V_{REF}$, the differential amplifier circuit 41 is operated and generates the detection signal. The detection signal is transmitted to the current control circuit 5 to lower the current value of an error signal A. As a result, the error signal A reduces. Thereby, the output current of the power transistor Qp is reduced to cause to return to the direction of the rated value. When the output current of the power transistor Qp is reduced and returned to the rated value, the current flowing through the transistor $T_{r2}$ decreases and the terminal voltage Vs at the resistor Rs reduces equal to or less than the divided voltage $V_{REF}$. As a result, the detection signal ceases.

The initiating timing of such over current preventing operation is determined by the value of the divided voltage $V_{REF}$ serving as the comparing reference for the terminal voltage Vs. The divided voltage $V_{REF}$ is selected depending on the resistance value of resistors connected downward of the resistor Ra and the selection of the resistance value is performed in accordance with the voltage value applied at the input terminal 33. As a result, the output current value of the power transistor Qp which determines the initiating timing of the over current control can be selected in accordance with the voltage value applied to the terminal 33.

Hereinbelow, the selection of the output current value is explained. The voltage of the input signal applied at the input terminal 33 is compared with the respective reference voltages Va, Vb, Vc, ..., Vn at the respective comparators 31a, 31b, 31c, ..., 31n having the reference voltages Va, Vb, Vc, ..., Vn at their respective inputs. The outputs of the comparators having lower reference voltage than the voltage of the input signal (external signal) among these reference voltages Va, Vb, Vc, ..., Vn vary from "H" to "L". Thereby, the switching circuits which receive "L"

output from the concerned comparators among the switching circuits 32a, 32b, 32c, ..., 32n are turned OFF. Further, the output of the comparators having at their inputs reference voltages equal to or higher than the voltage of the input signal (external signal) are maintained at "H" and the switching circuits receiving the "H" output stay at the turned ON condition. Accordingly, resistors to be connected downward to the resistor Ra are selected depending on the turn ON and OFF conditions of the switching circuits.

The above selection is further explained. Since the reference voltages are set in the relation of Va<Vb<Vc<...<Vn, when the DC voltage value (voltage of the external signal) applied to the input terminal 33 increases from the reference voltage Va toward the reference voltage Vn, the comparators 31a, 31b, 31c, ..., 31n successively generate "L" output in the order of 31a, 31b, 31c, ..., 31n and the respective switching circuits 32a, 32b, 32c, ..., 32n are also successively turned OFF in the order of 32a, 32b, 32c, ..., 32n depending on the "L" outputs. When the respective switching circuits are successively turned OFF, the junction points Na, Nb, Nc, ..., $N_{n-1}$ are successively disconnected from the ground GND in the order of Na, Nb, Nc, ..., $N_{h-1}$ and accordingly the resistors Rb, Rc, ..., Rn are successively connected between the lower side of the resistor Ra and the ground GND.

As a result, the resistance value of the series resistor to be connected to the lower side of the resistor Ra can be selected depending on the magnitude of the voltage value of the external signal voltage Vi applied to the input terminal 33. Thereby, the divided voltage $V_{REF}$ at the junction point N can be selected. When a high voltage is set for the input signal voltage Vi, the divided voltage $V_{REF}$ is likely raised so that the comparing reference voltage at the (+) input of the differential amplifier circuit 41 is raised. As a result, the terminal voltage Vs at the over current detection use resistor Rs for generating the detection signal from the differential amplifier circuit 41 is also raised. When a lower voltage is set for the input signal voltage Vi, an opposite condition of the above is induced.

Further, depending on an increase of the terminal voltage Vs the output current value of the power transistor Qp (transistor Qp') which is limited by the output of the differential amplifier circuit 41 increases. Thereby, the current value to which a protective operation as an over current is to be performed can be increased.

Herein, the inherent rated current value of the power transistor Qp is equal to or larger than the detection over current value which is determined depending on the maximum divided voltage $V_{REF}$ which is set when all of the switching circuits 32a, 32b, 32c, ..., 32n are turned OFF.

Further, the output voltage of the differential amplifier 41 decreases depending on the differential value of Vs–$V_{REF}$ and the detection signal increases the sink current at the output terminal of the differential amplifier 41. Still further, when Vs≦$V_{REF}$, the output of the differential amplifier 41 is clamped at a constant voltage.

The respective resistance values of the resistors Ra, Rb, Rc, ..., Rn are respectively selected based on over current values to be detected which are determined depending on the divided voltage $V_{REF}$ generated at the junction point N when the respective junction points Na, Nb, Nc, ..., $N_{n-1}$ are grounded. Thus, an over current value to be detected can be externally selected depending on the external voltage Vi inputted from the input terminal 33 and the rated output current of the power transistor Qp can be limited at the selected over current value. Now, in order to simplify the explanation, it is assumed that the resistors in the series circuit for generating the divided voltage $V_{REF}$ includes resistors R, Ra, Rb and Rc, and for example, no voltage is applied to the input terminal 33, a divided voltage $V_{REF}$ depending on the resistance ratio of the resistors R and Ra is generated. At this instance the resistance values of the resistors R and Ra are selected so that the rated current value (detection over current value) is set at 1.0 A.

When a voltage of 1.5 V is applied at the input terminal 33, an output is generated at the comparator 31a, the switching circuit 32a is turned OFF and a divided voltage $V_{REF}$ depending on the resistance ratio of the resistance value of the resistor R and the summed resistance value of the resistors Ra and Rb is generated. Therefore, the resistance value of the resistor Rb is selected so that a rated current value to be protected as an over current is set at 1.2 A. Further, when a voltage of 3 V is applied at the input terminal 33, outputs are generated at the comparators 31a and 31b, the corresponding switching circuits 32a and 32b are turned OFF and a divided voltage $V_{REF}$ depending on the resistance ratio of the resistance of resistor R and the summed resistance of the resistors Ra, Rb and Rc. Therefore, the resistance value of the resistor Rc is selected so that a rated current value (detection over current value) to be protected as an over current is set at 1.5 A.

Figure 2:
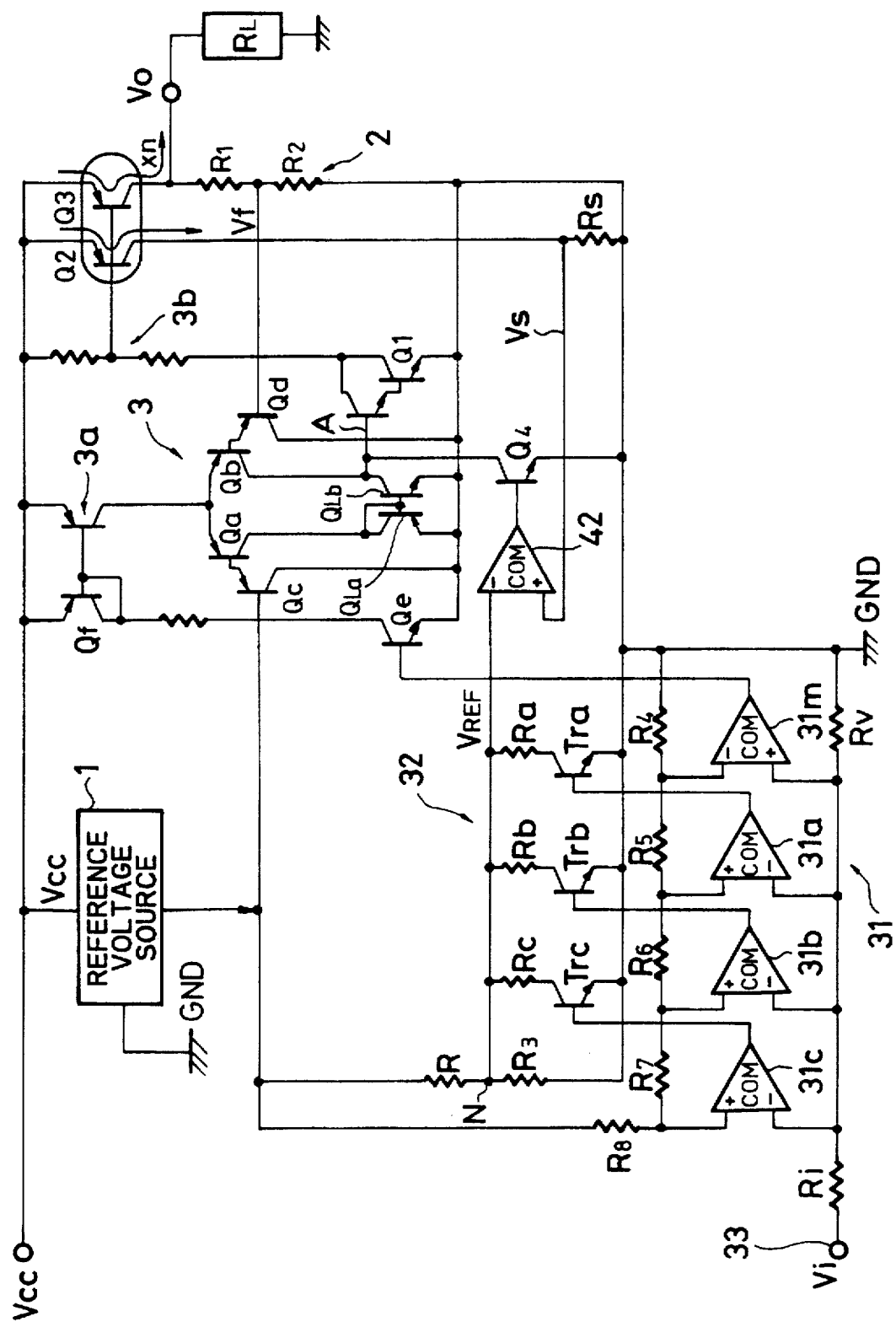
FIG. 2 is a view for explaining an example of the concrete circuit diagrams to be formed into an IC according to the embodiment as shown in FIG. 1.

FIG. 2 is an embodiment wherein the over current protection is performed through a control which ceases the operation of the power transistor for the power source voltage regulation. In the present embodiment, in place of the npn power transistor Qp in FIG. 1 a pnp power transistor Q3 is provided and further in place of npn transistor Qp' for over current detection and the current mirror 42 a pnp transistor Q2 is provided. Therefore, the emitter side of the transistor Q2 is grounded via the detection use resistor Rs without being connected to the output terminal.

The bases of the output stage transistors Q2 and Q3 are connected to the collector of a transistor Q1 in Darlington connection used for an output stage drive via a resistance biasing circuit 3b, and the error signal A from the error amplifying circuit 3 is input to the base of the transistor Q1.

Further, in the present embodiment, in place of the differential amplifier circuit 41 and the current control circuit 5, a switching circuit constituted by a comparator (COM) 42 and a transistor Q4 is provided. The transistor Q4 is turned ON when it receives an output from the comparator 42 and grounds the base of the transistor Q1 which receives the error signal A to turn OFF the transistor Q1.

In the present embodiment, the error amplifying circuit 3 is constituted by differential transistors Qa and Qb, transistors QLa and QLb serving as an active load, transistors Qc and Qd for driving the respective transistors Qa and Qb and a constant current source 3a.

In the present embodiment, the voltage selecting circuit 31 is provided with, other than the three comparators (COM) 31a, 31b and 31c, a comparator (COM) 31m which sets a predetermined constant current at the constant current source 3a and operates the error amplifying circuit 3.

When a signal (external signal) having a certain voltage beyond a predetermined voltage is set at the input terminal 33, at first the comparator 31m is operated to turn ON a transistor Qe, thus the constant current source 3a is operated via a transistor Qf which is connected in current mirror with the transistor for the constant current source 3a, thereby the error amplifying circuit 3 is rendered into an operating condition.

Further, the voltage generating circuit 32 in the present embodiment sets the divided voltage $V_{REF}$ on the junction point N at a lower value by turning ON switching circuits and by adding parallel resistors. On the other hand, the divided voltage $V_{REF}$ is successively increased by successively turning OFF the respective switching circuits.

Namely, transistor switching circuits Tra, Trb and Trc serving as the switching circuits 32a, 32b and 32c are respectively inserted in series with the resistors Ra, Rb and Rc. Further, these series circuits of the resistors Ra, Rb and Rc and the switching circuits are connected in parallel with a resistor R3 which is connected between the (−) terminal of the comparator (COM) 42 and the ground GND. With these parallel connections a resistance circuit is constituted.

The resistor R is disposed between the (−) input terminal of the comparator (COM) 42 and the base of the differential transistor Qc to which the reference voltage source 1 is connected, and thereby a divided voltage $V_{REF}$ is generated at the junction point N.

As a result, a divided voltage $V_{REF}$ which is selected by the voltage generating circuit 32 depending on the turning ON/OFF of the switching circuits 32a, 32b and 32c is applied at the (−) input of the comparator 42. The comparator 42 receives at the (+) input the terminal voltage Vs across the resistor Rs, compares the received terminal voltage Vs with the divided voltage $V_{REF}$ at the (−) input and generates output "H" when the terminal voltage Vs exceeds the divided voltage $V_{REF}$. The output "H" is applied to the base of the transistor Q4 to render the transistor Q4 from turn OFF condition to turn ON condition. Thereby, the base of the drive transistor Q1 in Darlington connection is grounded to interrupt the error signal A, the operation of the drive circuit for the current detection use transistor Q2 and the power transistor Q3 is ceased and the output current of the power transistor is shifted toward the turning OFF direction. In FIG. 2 embodiment RL is a load circuit.

In the present stabilized power source circuit, the outputs of the comparators 31a, 31b, 31c and 31m vary depending on the voltage value of the external signal applied to the input terminal 33 as illustrated in the Table in FIG. 3. In the table, H represents "H" and L represents "L", and transistors among the transistors Qe, Tra, Trb and Trc which receive output "H" from the respective comparators 31m, 31a, 31b and 31c are turned ON. Depending on the turned ON transistors the entire resistance value of the resistor circuit connected in parallel at the (−) input terminal of the comparator 42 is determined and a divided voltage $V_{REF}$ depending on the entire resistance value is applied at the (−) input terminal of the comparator 42.

The relation between the outputs of the comparators 31a, 31b, 31c and 31m and the voltage value applied to the input terminal 33 is determined by the resistances of the resistors R8, R7, R6, R5 and R4 in the series resistor circuit connected successively between the base of the transistor Qc and the ground GND. Hereinbelow the relation is explained.

Since the reference voltage Vr from the reference voltage source 1 is provided at the base of the transistor Qc, the reference voltage Vr divided by the resistors R8, R7, R6, R5 and R4 in the series resistor circuit and successively increasing predetermined divided voltages are generated at the junction points of the respective resistors. On one hand, the (−) input of the comparator 31m is connected to the junction point of the resistors R4 and R5, and the (+) inputs of the comparators (COM) 31a, 31b and 31c are respectively connected to the junction point of the resistors R5 and R6, the junction point of the resistors R6 and R7 and junction point of the resistors R7 and R8. With this circuit structure, the voltage values of the respective comparators are successively increased in the order of 31a<31b<31c. The (+) input terminal of the comparator 31m and the (−) input terminals of the comparators 31a, 31b and 31c are connected to the input terminal 33 via the resistor Ri.

As a result, output either "H" or "L" of the respective comparators is determined depending on the voltage value applied at the input terminal 33 and the resistance values of the respective resistors R8, R7, R6, R5 and R4 are set so that when the DC voltage Vi applied at the input terminal 33 is less than a first predetermined value of '0.9 V' the output of the comparator 31m is rendered to "L" as illustrated in FIG. 3, and thereby the transistor Qe is turned OFF and the operation of the differential amplifier circuit 3 is inhibited. On the other hand, the resistance values of the respective resistors R8, R7, R6, R5 and R4 render the output of the comparator 31m "H" when the DC voltage Vi applied at the input terminal 33 exceeds predetermined value '0.9 V', turn ON the transistor Qe and operate the differential amplifier circuit 3, and thus the control of the output current of the transistor Q3 is performed under the over current detection condition which is explained hereinbelow.

When the DC voltage Vi applied at the input terminal 33 is in a range of a second predetermined value of '1.0–1.9 V', the outputs of the comparators 31a, 31b and 31c are rendered to "H" and the transistors Tra, Trb and Trc are turned ON so that the comparing input voltage of the comparator 42 shows the lowest value. Under such condition, the differential amplifier circuit 3 is operated, the over current detection is performed and the output current of the transistor Q3 is controlled. At this instance, the over current control is performed at the minimum output current value of the transistor Q3.

When the DC voltage Vi applied at the input terminal 33 is in the range of a third predetermined value of '2.0–2.9', the output of the comparator 31a is rendered into "L" and the transistors Tra is turned OFF, the outputs of the comparators 31b and 31c are rendered into "H" and the transistors Trb and Trc are turned ON so that the comparing input voltage of the comparator 42 shows the second lowest value. Under this second lowest comparing input voltage the over current detection is performed and the output current of the transistor Q3 is controlled. At this instance, the over current control for the output current value of the transistor Q3 is performed at the second lowest value.

When the DC voltage Vi applied at the input terminal 33 is in the range of a fourth predetermined value of '3.0–3.9 V', the outputs of the comparators 31a and 31b are respectively rendered into "L" and the transistors Tra and Trb are respectively turned OFF, the output of the comparator 31c is rendered into "H" and the transistor Trc is turned ON so that the comparing input voltage of the comparator 42 shows a higher value than the second lowest value. Under this comparing input voltage the over current detection is performed and the output current of the transistor Q3 is controlled. At this instance, the over current control for the output current value of the transistor Q3 is performed at the larger value than the second lowest value.

When the DC voltage Vi applied at the input terminal 33 is in the range of a fifth predetermined value of 'more than 4.0 V', the outputs of the comparators 31a, 31b and 31c are respectively rendered into "L" and the transistors Tra, Trb and Trc are respectively turned OFF so that the comparing input voltage of the comparator 42 shows the maximum value. Under this maximum comparing input value the over current detection is performed and the output current of the transistor Q3 is controlled. At this instance, the over current control for the output current value of the transistor Q3 is performed at the maximum value.

As will be seen from the above, the outputs of the comparators 31a, 31b and 31c are successively rendered into "L" depending on the voltage value of the external signal applied at the input terminal 33 and the resistance values of the respective resistors R8, R7, R6, R5 and R4, and the switching circuits Tra, Trb and Trc are successively turned OFF so that comparing input values for the over current detection and the over current control can be selected from the minimum value to the maximum value, thereby the rated output current of the output transistor Q3 which depends on an over current value to be detected can be set afterward in accordance with the voltage from the input terminal 33.

The output circuit (the output transistor circuit) for performing the power source voltage regulating operation as explained in connection with the embodiments is not limited to the specific constitutions of the embodiments, further the over current detection circuit and the comparing value generating circuit are also not limited to those as explained in connection with the embodiments.

In the present embodiments, the voltage values are referred to as the comparing values for the comparators and the differential amplifier circuit, current values can be used as the comparing values for these circuits. Further, the input relation at the (+) inputs and the (−) inputs of the comparators and the differential amplifier circuit is a comparative one, therefore the input relation as explained in the present embodiments can be of course exchanged. Still further, in the present embodiments when the outputs of the respective comparators 31a, 31b, 31c, . . . are in "L" the corresponding circuits are turned OFF, however, this can be inverted in that when the outputs of the respective comparators 31a, 31b, 31c, . . . are in "H", the corresponding switching circuits can be turned OFF. Moreover, contrary to the present embodiments when the outputs of the respective comparators are in "L", the corresponding switching circuits can be turned ON so that a reference voltage $V_{REF}$ is selected.

We claim:

1. A stabilized power source circuit for stabilizing an output voltage of an output power transistor, wherein stabilization is obtained by reducing a voltage from a power source at a constant voltage thereby generating an error signal, which depends upon either the difference between the constant voltage and the output voltage or the difference between a voltage obtained by multiplying the constant voltage by a predetermined rate and a voltage obtained by multiplying the output voltage by the predetermined rate, and stabilizing the output voltage at the constant voltage by controlling an output current of the output transistor based on the error signal, the stabilized power source circuit comprising, an over current protecting circuit which obtains either a current value or a voltage value corresponding to the output current value of said output transistor as an detected value, compares the detected value with a predetermined constant value and lower the output current when the detected value exceeds the predetermined constant value;

a comparing value generating circuit which receives an external signal, generates one of either a predetermined plurality of voltage values or a predetermined plurality of current values in response to the level of the received external signal and transmits the same to said over current protecting circuit as the predetermined constant value, wherein either the predetermined plurality of voltage values or the predetermined plurality of current values are provided so as to correspond to the respective over currents of said output transistor and an inherent rated current value of said output transistor is selected to be equal to or larger than the maximum value among the respective output current values; and an over current detection use transistor connected in parallel with said output transistor, wherein said over current protecting circuit determines the output current value of said output transistor by detecting the current flowing through said over current detection use transistor;

wherein both the detected value and the predetermined constant value are respectively voltage signals, and said over current protecting circuit includes a differential amplifier circuit which receives the detected value and the predetermined constant value, and the error signal is lowered by the output of said differential amplifier circuit when the detected value exceeds the predetermined constant value; and wherein the external signal is a voltage signal, and said comparing value generating circuit includes a plurality of comparators to which first inputs respectively different reference voltages are input and to which second inputs the external signal is applied, a plurality of switching circuits which are provided so as to corresponds to said plurality of comparators and are turned ON or OFF when output signals from said corresponding comparators are received, and a resistor circuit which generates the predetermined constant value depending on the turning ON or OFF of said plurality of switching circuits.

2. A stabilized power source circuit according to claim 1, wherein said over current protecting circuit performs a control to cease the operation of said output transistor when the detected value exceeds the predetermined constant value.

3. A stabilized power source circuit according to claim 2, wherein both the detected value and the predetermined constant value are respectively voltage signals, and said over current protecting circuit includes a comparator which receives the detected value and the predetermined constant value, and the error signal is ceased by the output of said comparator when the detected value exceeds the predetermined constant value.

4. A stabilized power source circuit according to claim 3, wherein the external signal is a voltage signal, and said comparing value generating circuit includes a plurality of comparator to which first inputs respectively different reference voltages are input and to which second inputs the external signal is applied, a plurality of switching circuit which are provided so as to correspond to said plurality of comparators and are turned ON or OFF when output signals from said corresponding comparators are received, and a resistor circuit which generates the predetermined constant value depending on the string ON or OFF of said plurality of switching circuits.

5. A stabilized power source circuit according to claim 4, wherein said resistor circuit is a voltage dividing resistor circuit which is constituted by a first resistor and a plurality of parallelly connected second resistors connected in series with said first resistor, said plurality of switching circuits are respectively connected in series with at least some of said plurality of second resistors, and the predetermined constant value is generated at the junction point between said first resistor and said parallelly connected second resistors.

6. A stabilized power source circuit according to claim 1, wherein said resistor circuit is a voltage dividing resistor circuit constituted by a plurality of resistors connected in series, said plurality of switching circuits are respectively connected between one of junction points of said plurality of resistors constituting said voltage dividing resistor circuit and a predetermined reference voltage line and the predetermined constant value is generated at one of the junction points of one of the resistors in said voltage dividing resistor circuit to which no switching circuit is connected.

7. An IC having a stabilized power source circuit for stabilizing an output voltage of an output power transistor, wherein stabilization is obtained by reducing a voltage from a power source at a constant voltage thereby generating an error signal, which depends upon either the difference between the constant voltage and the output voltage or the difference between a voltage obtained by multiplying the constant voltage by a predetermined rate and a voltage obtained by multiplying the output voltage by the predetermined rate, and stabilizing the output voltage at the constant voltage by controlling an output current of the output transistor based on the error signal, the IC having a stabilized power source circuit comprising, an over current protecting circuit which obtains either a current value or a voltage value corresponding to the output current value of said output transistor as an detected value, compares the detected value with a predetermined constant value and lowers the output current when the detected value exceeds the predetermined constant value; and a comparing value generating circuit which receives an external signal, generates one of either a predetermined plurality of voltage values or a predetermined plurality of current values in response to the level of the received external signal and transmits the same to said over current protecting circuit as the predetermined constant value, wherein either the predetermined plurality of voltage values or the predetermined plurality of current values are provided so as to correspond to the respective output current values to be detected as the respective over currents of said output transistor and an inherent rated current value of said output transistor is selected to be equal to or larger than the maximum value among the respective output current values; and wherein the external signal is a voltage signal, and said comparing value generating circuit includes a plurality of comparators to which first inputs respectively different reference voltages are input and to which second inputs the external signal is applied, a plurality of switching circuits which are provided so as to corresponds to said plurality of comparators and are turned ON or OFF when output signals from said corresponding comparators are received, and a resistor circuit which generates the predetermined constant value depending on the turning ON or OFF of said plurality of switching circuits.

8. An IC having a stabilized power source circuit according to claim 7, wherein said over current protecting circuit performs a control to cease the operation of said output transistor when the detected value exceeds the predetermined constant value.

9. A stabilized power source circuit according to claim 8, wherein said resistor circuit is a voltage dividing resistor circuit constituted by a plurality of resistors connected in series, said plurality of switching circuits are respectively connected between one of junction points of said plurality of resistors constituting said voltage dividing resistor circuit and a predetermined reference voltage line and the predetermined constant value is generated at one of the junction points of one of the resistors in said voltage dividing resistor circuit to which no switching circuit is connected.

10. A stabilized power source circuit according to claim 7, wherein said resistor circuit is a voltage dividing resistor circuit constituted by a plurality of resistors connected in series, said plurality of switching circuits are respectively connected between one of junction points of said plurality of resistors constituting said voltage dividing resistor circuit and a predetermined reference voltage line and the predetermined constant value is generated at one of the junction points of one of the resistors in said voltage dividing resistor circuit to which no switching circuit is connected.

* * * * *